Aug. 19, 1952     W. A. PERRY ET AL     2,607,663
CATALYST UNIT

Filed July 25, 1947     2 SHEETS—SHEET 1

INVENTORS
WILLIAM A. PERRY
DAVID R. MERRILL
BY
T. Wallace Quinn
ATTORNEY

INVENTORS
WILLIAM A. PERRY
DAVID R. MERRILL
BY
T. Wallace Brown
ATTORNEY

Patented Aug. 19, 1952

2,607,663

UNITED STATES PATENT OFFICE 2,607,663

CATALYST UNIT

William A. Perry, Bristol, Pa., and David R. Merrill, Moorestown, N. J., assignors to Rohm & Haas Company, Philadelphia, Pa., a corporation of Delaware Application July 25, 1947, Serial No. 763,550

4 Claims. (Cl. 23—288)

This invention relates to catalyst units for gaseous reactions. More specifically it relates to such units made up of metal gauze in a mounting of thin sheet or foil. The catalyst units of this invention are adapted for reacting gases at elevated temperatures with high efficiency and with long life for the catalyst unit. These units are particularly useful in effecting exothermic reactions which involve carbon-containing gases.

Wire gauzes, commonly of a noble metal or an alloy thereof, such as platinum, platinum-iridium, or platinum-rhodium, have long been used as catalysts. A difficulty in the use of gauze catalysts results from an unevenness of temperature in layers of gauze. While it is now found essential for maximum efficiency to maintain the entire area of a gauze catalyst at a uniform temperature, an even temperature is not generally obtained throughout a pack of gauzes in constructions heretofore used, particularly near the edges of the gauze where it is mounted in a reaction vessel. The flow of heat in the edges near the supporting structure is sufficient to produce a considerable area below the optimum temperature for reaction. When carbon-containing gases are reacted on such a gauze, carbon forms relatively rapidly and deposits on areas which are below suitable operating temperatures. Aside from the loss in efficiency resulting from carbon deposits, the carbon causes granulation and disintegration of the metal of the gauze.

Several proposals have been made to remedy this situation. According to one, the edges of a catalyst gauze are rinsed with gases which can form no carbon. This, however, has not been found to eliminate deposition of carbon. Furthermore, this procedure greatly decreases the capacity or efficiency of the apparatus. By another proposal the disintegration of the gauze catalyst is accepted as inevitable and unavoidable, and a bed of broken ceramic ware is placed directly below the gauze to catch the products of disintegration. This, however, does not permit operation at or near maximum efficiency and serves to introduce new complications. Furthermore, the use of refractory material coated with a metal catalyst does not provide the efficiency which is now possible from a gauze catalyst of the type here disclosed.

An important reaction wherein carbon-containing gases are involved is the formation of hydrogen cyanide from oxides of nitrogen and hydrocarbons or from hydrocarbons, ammonia, and oxygen. Here, temperatures of 900° to 1400° C. are involved and the life of gauze catalysts has not heretofore been very long. Carbon deposition followed by granulation and then disintegration occurs at regions in the usual gauze pack where differences in temperature exist, particularly around the edges of the usual plurality of layers of gauze held as a catalyst unit in a reaction vessel. Such a situation does not permit efficient or economical operation of the reaction apparatus.

It has now been found possible to overcome difficulties such as have been described. This is accomplished by providing a gauze catalyst unit wherein a plurality of layers of metal gauze are welded together at points of contact to form a gauze pack and the pack is mounted in a surrounding frame or holder consisting of metal sheet or foil. This frame is so designed that it may be firmly held by the walls of the reaction vessel and so snugly held there that gases do not bypass the gauze pack. A portion of the frame extends from the walls of the reaction vessel inwardly sufficiently to support therein the temperature gradient from the temperature of the gauze pack to that of the vessel walls, thus permitting the entire area of the pack to remain at a substantially uniform reaction temperature. The extension of the sheet of the frame is such as to provide an area which receives a supply of heat from the hot reacted gases and from radiation from the walls which are heated by the hot reacted gases and also by radiation from the gauze pack itself. These sources of heat offset to a large extent the conduction of any significant amount of heat from the edge of the gauze pack into the frame of metal sheet.

In a preferred form of this invention the frame about the gauze pack contains one or several corrugations or grooves which surround the gauze pack. The corrugation has the effect of increasing the area of the metal sheet in the frame or rim surrounding the gauze without decreasing the area of gauze available for the catalytic reaction. The corrugation may also serve as an expansion joint or flexible connection between the rather hot gauze pack and the walls of the reaction vessel, thus permitting changes in dimensions of the gauze pack when it is heated up or cooled without complicating the mounting of the frame in the reaction vessel.

The nature of the invention will be readily understood from consideration of the accompanying drawings, in which the features of construction of the catalyst units and of the various embodiments of this invention are set forth.

Figure 4:
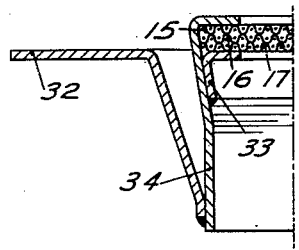
Figure 5:
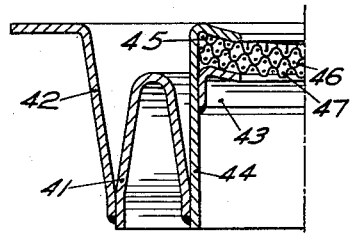
Figure 6:
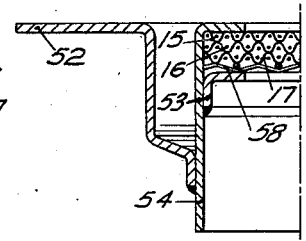

Figures 4, 5, and 6 show in partial section variations in the mounting of the gauze packs in the catalyst unit and illustrate three types of frames or holders for supporting the gauze pack.

Figure 7:
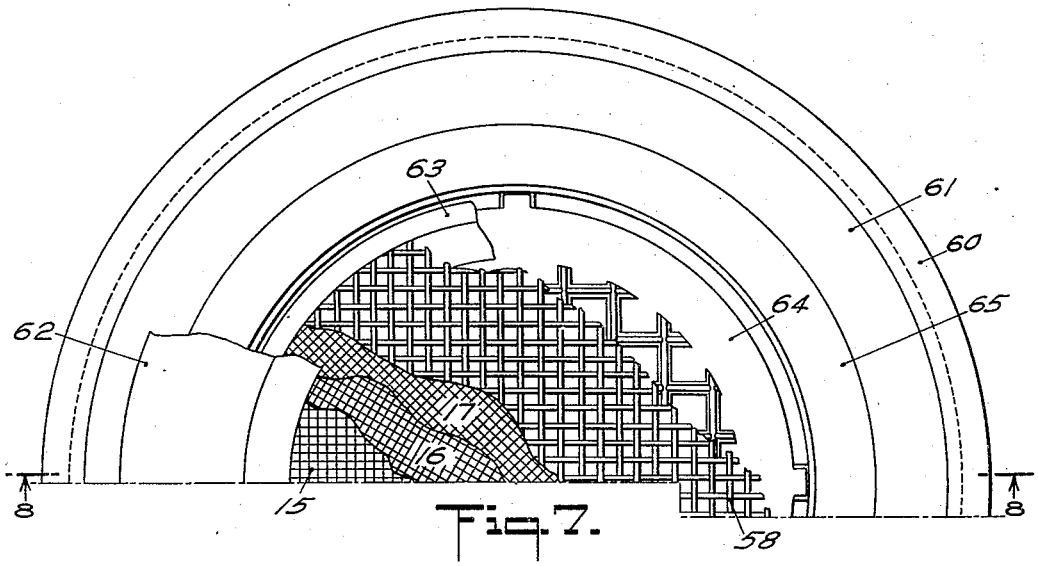
Figure 8:
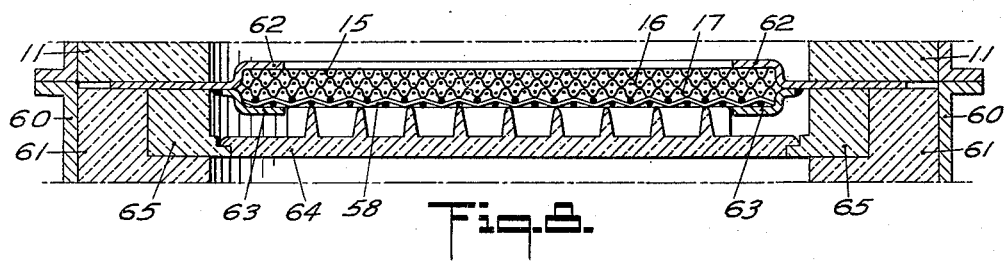
Figure 9:
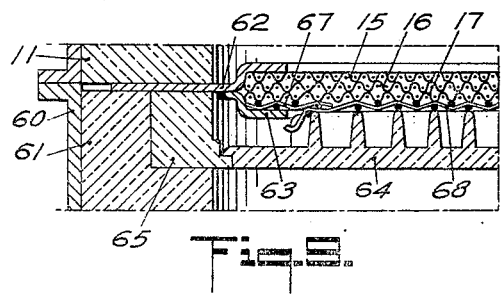

Figures 7, 8, and 9 illustrate in section or partial section a further type of frame and mounting for the gauze pack including means for supporting the gauze pack within the reaction vessel.

Figure 1:
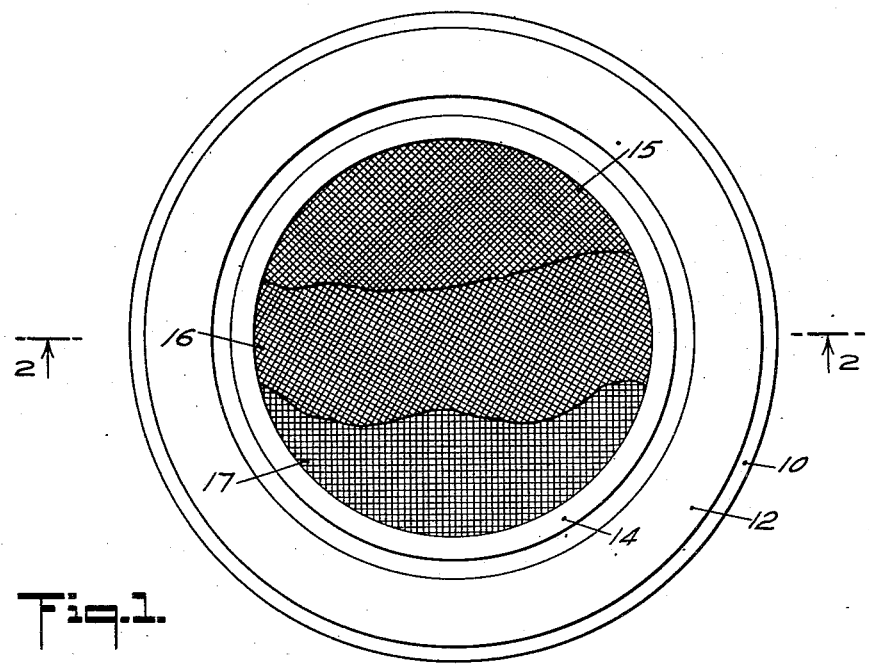
Figure 1 is a plan view of a catalyst unit having a plurality of gauzes with portions thereof shown partly cut away.
Figure 2:
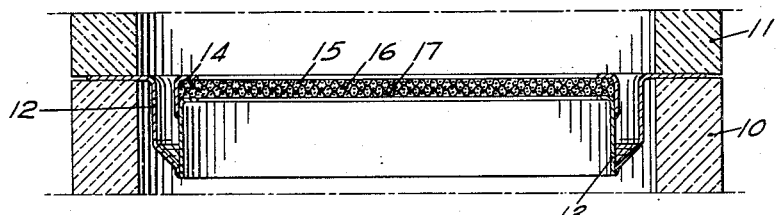
Figure 2 is a cross-sectional view of the catalyst unit taken along line 2—2 of Fig. 1 in the direction indicated by the arrows and showing the unit mounted within the walls of a reaction vessel.

In Figures 1 and 2 the layers of gauze, indicated by the numerals 15, 16, and 17, are tap-welded together at points of contact to ensure uniform strength and distribution of heat throughout the pack of gauzes. The gauze pack thus formed is firmly held in the supporting element composed of rings 13 and 14 of sheet or foil, which are welded together. Ring 13 is also welded to element 12 and these two parts together form a groove or corrugation about the gauze pack. The frame thus formed of sheet or foil is securely mounted in the walls of the reaction chamber lined with material to resist high temperatures. The outer edge or rim of element 12 extends between the lower wall 10 and the upper wall 11 of the reaction vessel.

Figure 3:
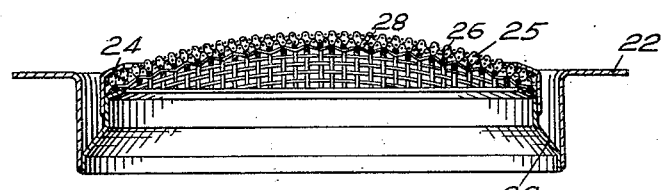
Figure 3 is a cross-sectional view of a modification of the catalyst unit.

In Figure 3 there is shown a catalyst unit in which two layers of fine gauze, 25 and 26, are welded together at their points of contact and the lower side of the layer 26 is in turn welded at its points of contact to a relatively coarser screen 28 of sufficient stiffness to hold the assembly in a dome-like form. The edge of the pack of screens or gauzes is held firmly by a surrounding rim consisting of rings 23 and 24 which are welded together. The ring 23 is in turn welded to an outwardly extending element 22, which presents a flange for mounting the unit within the walls of a reaction chamber.

The groove formed by rings 22 and 23 in Figure 3, as well as rings 12 and 13 in Figures 1 and 2 have horizontal and vertical dimensions such that with changes in temperature expansion and contraction of the gauze pack can take place without distortion or strain. The surface presented by the foil elements forming the frame, in which is located the groove, is such that, when the catalyst unit is in use, sufficient heat is gained from the hot gases by conduction and from the heated gauze and chamber walls by radiation to cause the edge of the gauze pack to be maintained at substantially the same temperature as the rest of the gauze pack.

Further modifications of the present invention are illustrated in Figures 4, 5, and 6. The construction shown in Figure 4 comprises a pack of screens or gauzes consisting of three layers of screens 15, 16, and 17 welded together at their points of contact. This screen pack is supported about its edge and firmly held by rings 33 and 34 which are welded together to form a clamp about the edge of the pack of screens. Ring 34 has a downwardly extending flange and adjacent the lowermost portion thereof there is affixed an element 32 having an upwardly extending portion that forms a groove with the downwardly extending flange of ring 34. In addition, element 32 is provided with an outwardly extending flange which provides means whereby the catalyst unit may be mounted within the walls of a reaction chamber. In this modification the screen pack is positioned above the level of the flange portion of the mounting element 32.

The modification illustrated in Figure 5 consists of a series of three screens 45, 46, and 47 welded together at their points of contact into a pack. This pack in turn is mounted about its periphery in a clamp formed by rings 43 and 44. The downwardly extending portion of ring 44 engages the innermost of the two parts of an inverted U-shaped element 41 which is arranged peripherally of the downwardly extending portion of ring 44. The outermost part of element 41 is affixed adjacent its lower edge to a member 42 provided with a horizontally extending flange for mounting the assembly in a reaction chamber. The double groove thus formed gives an enhanced flexibility to the mounting of the gauze pack and an increased surface for picking up heat. In this modification the screen pack is positioned below the level of the flange for supporting the catalyst unit in place in a reaction chamber.

In Figure 6 a relatively coarse screen 58 supports the layers of relatively finer screen 15, 16, and 17. The various layers of screening are joined by tap-welding at points of contact. The ring or element 54 is shaped to hold the screen pack and extends downwardly therefrom to provide an extended area for receiving heat by radiation, thus preventing flow of heat from the screen pack. This pack is securely held against element 54 by the ring 53 which is welded thereto. Element 54 is attached at an intermediate point in its downwardly extending portion to ring 52 which extends away from element 54 and upwardly to form a groove together with element 54 and to provide a horizontal outwardly extending flange for mounting the catalyst unit in a reaction chamber.

In Figures 7, 8, and 9 still further modifications in mounting are shown. Figure 8 shows a cross-sectional view of Figure 7 taken along the line 8—8 in the direction of the arrows. Figure 9 is a similar partial cross-sectional view with slight modification in the support for the screen pack.

The layers of screen or gauze 15, 16, and 17 are welded at points of contact to form a pack which is securely mounted within the ring 62 which presents an outwardly extending flange for mounting the catalyst unit within the reaction chamber. The gauze pack is supported by a relatively coarse screen 58 and the gauze pack and screen are held to ring 62 by ring 63 which is welded thereto. Rings 62 and 63 present sufficient surface within the walls of the reaction vessel to pick up enough heat from the hot gases by conduction and from the hot walls and screen by radiation to hold the gauzes at a substantially uniform temperature throughout.

The outwardly extending flange of ring 62 is held between parts of the lining of the reaction chamber indicated by 11, 61, and 65. These are of a refractory material and are retained within the wall 60 of the reaction vessel, which may contain a flange, as indicated, for convenience in placing the catalyst unit and supporting structure within the reaction vessel. The part of the lining designated as 65 provides a support for grid 64 on which screen 58 rests as shown in Figures 7 and 8.

In Figure 9 the gauze pack is shown supported by a coarse screen 68 which is in turn supported by grid 64. The pack in this embodiment of the invention merely rests upon the coarse screen, providing in this way considerable flexibility in the mounting and allowing for changes in dimensions which result when the catalyst unit is put in operation. The portion of the screen pack near the edge thereof is supported by an annular ring of screening 67 which projects upwardly only far enough to overlap the main supporting screen 68. Thus, elements 67 and 68 in Figure 9 in effect replace screen 58 in Figure 8.

As indicated in the various embodiments which are shown in the drawings, the gauze packs presenting a catalytic surface are composed of a plurality of layers of gauze or screening. The gauze or screening may be made from any metal which has activity for promoting chemical reactions catalytically. The precious metals are commonly and effectively used in this way, including platinum and alloys thereof with rhodium or iridium. While, because of the expense involved in replacing such catalyst units, the long life of catalyst units made according to this invention is of particular advantage, the invention is not limited to units of precious metals. Similarly constructed units may be made from other metals such as copper or nickel and used in appropriate reactions with advantage.

In the preparation of a catalyst unit of this invention two or more layers of gauze or screening are assembled. One layer is slightly rotated from the next as to the direction of the component filaments or wires making up the layers. Thus, the wires in one layer are at an angle to the wires in the contiguous layer or layers.

Usually the wires in a catalyst gauze are of a diameter from 0.0025 to 0.006 inch. A diameter of 0.003 inch is particularly suitable and useful. Such wires are conveniently assembled in an 80 mesh screen, but finer or coarser screens may be used. The mesh size may vary with the particular size of wire selected. Mesh sizes of 60 to 120 are commonly used. Different diameters of wire and different meshes may be used in the various layers of screen making up a pack. Thus, a relatively heavier screen may be used along with one or more relatively lighter screens to form a pack. After the various layers have been assembled, preferably with the described orientation of one layer to another, they are joined at points of contact by a welding process.

Methods of welding, as is known, include those which are based on fusion-welding and also on forge-welding, wherein metal objects are heated to a plastic state and forced together under pressure as from rolling or tapping. The term "welding" is generic to these various ways of joining metal together. "Tap-welding" is a term applied to a form of forge-welding in which metal is joined under heat and pressure supplied by a blow or tap. These various welding techniques may all be applied in the construction of the catalyst units of this invention.

The gauze pack is firmly mounted in a frame composed of foil or sheet, which may suitably be of a thickness from 0.003 inch to 0.025 inch. The metal of the frame may be of the same composition as or different from that of the gauzes, the metals being selected with due regard to factors of temperature and resistance to chemical attack. For example, the gauzes may be of a platinum-rhodium alloy while the sheet may be of platinum-iridium or of another metal, such as gold alloy. The metal used for the fine screens need not be the same as that for the coarser screens used primarily for support.

In the preferred form of catalyst unit there is a groove or corrugation in the sheet frame about the gauze pack. The dimension across the groove, as has been indicated, should be enough to allow for expansion of the gauze portion from dimensions at room temperature to those at operating temperatures. It has been found, for example, that for a gauze pack of a diameter of six inches a cold clearance of 0.13 inch is sufficient where the operating temperature is 1000° C. For a catalyst unit of a diameter of 30 inches a clearance of about 0.5 inch is desirable where the screen operates at a temperature of 1100° to 1200° C. It has been found that the sheet frame holding the gauze pack should project from the reaction vessel walls at least three-eighths of an inch and may project as much as one to two inches with due regard for the total diameter of the catalyst unit.

Where a groove or loop is used in the preferred form of this invention, the total depth of this feature may vary from one-half to one and a half inches, being in general proportional to the diameter of the unit.

The effect of welding together layers of gauze and mounting the resulting pack in a frame of metal sheet may be seen from the following examples.

*Example 1*

A gauze pack was prepared from three layers of gauze consisting of a 90% platinum-10% rhodium alloy in the form of wires of 0.003 inch diameter woven in an 80 mesh (per inch) screen by fusing the three layers together only at their edges, as has been conventional. This pack was mounted in an apparatus by being clamped tightly between two stainless steel rings which made a gas-tight seal in the refractory-lined walls. A mixture composed of one volume of ammonia, 1.2 volumes of natural gas, and 6.5 volumes of air was passed through the gauze and ignited thereon. A 30% conversion of ammonia to hydrogen cyanide was obtained at 1130° C. Initial disintegration was soon noted near the walls. The gauze was burned through in spots within 26 hours.

Spot-welding of layers of gauze to hold them together gives exactly the same short life.

*Example 2*

A gauze catalyst welded about the edges as described in Example 1 was prepared and mounted in the refractory lining of the apparatus which was so arranged as to permit a flow of heated nitrogen gas to enter the reaction vessel at the area of contact of gauze and wall. The gas mixture of Example 1 was passed through the catalyst and ignited thereon. Conversion of ammonia to hydrogen cyanide rose to 43%, but within 70 hours the gauzes began to disintegrate and could no longer be used.

*Example 3*

The same kind of gauze as used in the previous examples was made into a three-layer pack six and one-half inches in diameter and fastened onto a flat ring of platinum foil of 0.008 inch thickness and of an outside diameter of ten inches. The gauze pack was held thereto by a smaller ring fitting over the edge of the gauze and being welded to the larger ring outwardly from the edge of the gauze pack. The outside ring or frame was mounted in the refractory lining of the apparatus so that about three-eighths of an inch of foil extended from the walls into the space within the vessel.

The same gas mixture as shown above was passed through the gauze and ignited thereon. The gauze, observed through a quartz window, now appeared to operate at a fairly uniform temperature over practically the entire area. Almost the whole drop in temperature from that of reacting gases to that of the cooler walls occurred within the foil. Conversion increased to 58%. Holes began to form, however, in the separate layers of gauze and the gauze became unusable after 290 hours of operation.

Example 4

A gauze pack was prepared from platinum-rhodium gauze such as used above (80 mesh screen of wire of 0.003" diameter, of 90% platinum and 10% rhodium). A pack of six layers was made with the direction of wires of one gauze rotated about 20° from the direction of wires of the next. The six layers were then heated with a torch and lightly tapped to cause welding together. The pack thus formed was mounted in a flat ring having an outside diameter of ten inches and an inside diameter of six inches. The edge of the pack was covered with a small ring which was molded over the edge thereof and welded to the first ring. The resulting catalyst unit was then securely mounted in the reaction vessel. The foil surrounding the gauze pack extended into the vessel about three-eighths of an inch.

The same mixture of gases as used above was passed through the screens of the catalyst unit and ignited thereon. A 68% conversion of ammonia to hydrogen cyanide was obtained. The entire area of the gauze pack appeared to be at a uniform temperature. This catalyst unit was kept in continuous operation for 3000 hours.

Example 5

A gauze pack was prepared as in Example 4 and mounted on a ring having a groove or corrugation which was one-half inch deep and one-eighth of an inch across. The pack was secured to the grooved ring by a smaller ring which was fitted tightly over the edge of the pack and was welded to the grooved ring. This catalyst unit was mounted in the same apparatus as used before. The same mixture of gases was passed through the pack and ignited on it. A conversion of 70% of the ammonia was attained. The catalyst unit was operated for 3200 hours and was still intact and ready for continued use when the reaction was discontinued. The entire area of the gauze was at a uniform temperature whenever observed through the quartz window of the apparatus. The capacity of the apparatus was quite as great with the grooved frame which occupied more space as with the flat frame which had a slightly larger diameter of screen.

The catalyst units of this invention are of real advantage in other gaseous reactions at elevated temperatures, such as the conversion of ammonia to nitric oxides or the formation of formaldehyde from methanol by partial combustion. In the latter case silver gauzes may be used and maintained at uniform temperatures over the entire area thereof by the nature of the mounting and the welding together of the several layers of silver gauzes. Operation at high efficiency and for extended periods of time is thus ensured.

The catalyst units of this invention are composed of a gauze pack and a surrounding frame which serves to support the pack in a fixed position in a reaction vessel. The pack is made up of two or more layers of metal screen or gauze which are welded together at points of contact. In the preferred form of the catalyst units the wires of one layer of gauze are oriented at an angle to the wires of the next layer. The pack is firmly held in a frame of metal sheet which is in turn mounted in the walls of the reaction vessel. The metal sheet extends away from these walls into the reaction vessel at least three-eighths of an inch. In the preferred form of this invention one or more grooves or corrugations are made in the portion of the supporting frame to increase the area of the frame exposed to the reaction temperature and to supply flexibility in the mounting of the pack thus allowing for thermal expansion and contraction. Units so constructed may be operated at high efficiency for extended periods of time.

We claim:

1. A catalyst unit which comprises a plurality of layers of catalytically-active metal gauze in intimate contact one with another over their surface areas, joined at their points of contact by welding to form a pack, and a frame of thin metal sheet securely fastened along its inner edge about the periphery of said pack, said frame having intermediate its edges downwardly and upwardly extending elements which form a groove therein, the outer portion of said frame being adapted to serve as means for mounting the catalyst unit in a reaction chamber, supporting the pack of the layers of gauze which are welded together, and forming a fixed, non-movable, gas-tight seal between the entire outer periphery of the said pack and the entire inner periphery of the reaction chamber.

2. A catalyst unit as described in claim 1 wherein the layers of gauze consist essentially of a platinum alloy.

3. A catalyst unit which comprises a plurality of layers of catalytically-active metal gauze composed of wire strands, said layers of gauze being in intimate contact one with another over their surface areas and joined at their points of contact by welding to form a pack, the strands of each gauze being at an angle to the strands of the next adjacent gauze, and a frame of thin metal sheet securely fastened along its inner edge about the periphery of said pack, said frame having intermediate its edges downwardly and upwardly extending elements which form a groove therein, the outer portion of said frame being adapted to serve as means for mounting the catalyst unit in a reaction chamber, supporting the pack of the layers of gauze which are welded together, and forming a fixed, non-movable, gas-tight seal between the entire outer periphery of the said pack and the entire inner periphery of the reaction chamber.

4. A catalyst unit as described in claim 3 wherein the layers of gauze consist essentially of a platinum-rhodium alloy.

WILLIAM A. PERRY.
DAVID R. MERRILL.

REFERENCES CITED

The following references are of record in the file of this patent:

UNITED STATES PATENTS

| Number | Name | Date |
| --- | --- | --- |
| 1,326,767 | Moore | Dec. 30, 1919 |
| 1,706,055 | Davis | Mar. 19, 1929 |
| 1,722,339 | Pauling | July 30, 1929 |
| 1,889,549 | Hechenbleikner et al. | Nov. 29, 1932 |
| 1,894,992 | Hechenbleikner et al. | Jan. 24, 1933 |
| 1,927,508 | Titlestad | Sept. 19, 1933 |
| 1,927,963 | Taylor | Sept. 26, 1933 |
| 2,045,632 | Colby | June 30, 1936 |
| 2,049,246 | Brown | July 28, 1936 |

FOREIGN PATENTS

| Number | Country | Date |
| --- | --- | --- |
| 119,639 | Great Britain | Oct. 10, 1918 |